United States Patent [19]

Miller

[11] 3,978,446
[45] Aug. 31, 1976

[54] ELECTRET CABLE HYDROPHONE ARRAY
[75] Inventor: G. Kirby Miller, Saratoga, Calif.
[73] Assignee: GTE Sylvania Incorporated, Mountain View, Calif.
[22] Filed: Aug. 25, 1975
[21] Appl. No.: 607,436

[52] U.S. Cl. .................... 340/7 R; 179/111 E; 307/88 ET
[51] Int. Cl.² .................. G01V 1/40; H04R 19/00
[58] Field of Search .................. 340/7 R, 9, 261; 179/111 E; 307/88 ET; 29/594, 595

[56] References Cited
UNITED STATES PATENTS

| | | | |
|---|---|---|---|
| 3,763,482 | 10/1973 | Burney et al. | 307/88 ET |
| 3,921,125 | 11/1975 | Miller et al. | 340/261 |
| 3,939,466 | 2/1976 | Horwath | 340/7 R |

Primary Examiner—Nelson Moskowitz
Attorney, Agent, or Firm—John F. Lawler

[57] ABSTRACT

A simplified hydrophone array for use in a towed marine streamer for seismic undersea exploration comprises a longitudinal series of electrically separate sensor sections comprising radially spaced coaxial inner and outer conductors and a plurality of longitudinally extending electret cables tightly fitted in the annular space between the conductors. Each cable has a conductive lead wire insulated by an electret covering, such as electrostatically charged tetrafluoroethylene (Teflon); an electrical signal between inner and outer conductors and across the electret is produced by acoustic energy transmitted to the outer conductor. The outer conductors are electrically insulated from each other and the inner conductor is longitudinally continuous throughout the length of the array and thus is common to all sections. The signal processing apparatus on the towing ship is connected to the individual sections by the lead wires which are connected to the outer conductors, respectively, and by the common inner conductor and so is responsive to the separate transducing actions of the several sections. A waterproof jacket around the outer conductors seals the assembly.

10 Claims, 6 Drawing Figures

ELECTRET CABLE HYDROPHONE ARRAY

RELATED CASE

Serial No. 607,436, filed Aug. 25, 1975 by Lucas et al.

BACKGROUND OF THE INVENTION

This invention relates to towed marine sensors used in seismic exploration and more particularly to an improved hydrophone line array.

In the practice of marine seismic sensings, a surface ship tows a 50 to 2,000 meter length of sensor line through the water in a submerged generally horizontal position. One form of such prior art sensor line is a series of longitudinally spaced transducers, such as piezoelectric crystals, mechanically integrated in a unitary body and connected by individual leads to signal processing and recording apparatus on the towing ship. The transducers in such line respond to reflections of acoustic wave energy from the floor of the sea and provide the desired data for identifying geological characteristics essential to a determination of the oil and mineral content of the explored regions. A typical hydrophone array using piezoelectric crystal transducers is described in U.S. Pat. No. 3,739,376.

Piezoelectric and similar transducers are delicate devices and their use in marine sensor lines has required considerable care to prevent damage to them. The repeated winding and unwinding of the line on and from the storage reel continually exposes the fragile transducer elements to impacts and stresses which adversely affect their sensitivity and life. As a consequence, such transducers are mounted within the line structure so as to protect them against such damage while at the same time attempting to maintain maximum exposure and sensitivity to acoustical wave energy incident to underwater exploration. One prior art technique for doing this is to immerse the transducers in long oil-filled plastic tubes. Such an array is heavy and bulky to tow, difficult to store and costly to construct and maintain.

Another disadvantage of prior art hydrophones is that the piezoelectric or similar transducer elements provide point omnidirectional sensitivity at spaced intervals along the array. This limits the resolution capability of the line which may be partially compensated by increasing the number of transducer elements at a corresponding increase in cost of the array.

OBJECTS AND SUMMARY OF THE INVENTION

A general object of this invention is the provision of a line hydrophone array that is uniformly sensitive throughout substantially its entire length.

A further object is the provision of a ruggedly constructed hydrophone array capable of withstanding rough handling and abuse without significant damage to the line or impairment of its performance.

Still another object is the provision of a line hydrophone array that is compact, light in weight and low in cost.

These and other objects of the invention are achieved with a line hydrophone comprising a longitudinal series of electrically separate coaxial sections formed with electret cables disposed between and tightly enclosed by radially spaced inner and outer conductors for producing an electrical signal in response to acoustic wave energy incident on the outer conductor. The outer conductors are elongated and tube-like with only slight physical separation between adjacent sections so that the array is sensitive substantially throughout its entire length. The electret calbes have the dual function of providing the desired volume of electret material between the inner and outer conductors and electrically connecting the outer conductors, respectively, to the signal processing apparatus on the towing ship.

DESCRIPTION OF PREFERRED EMBODIMENTS

Figure 1:
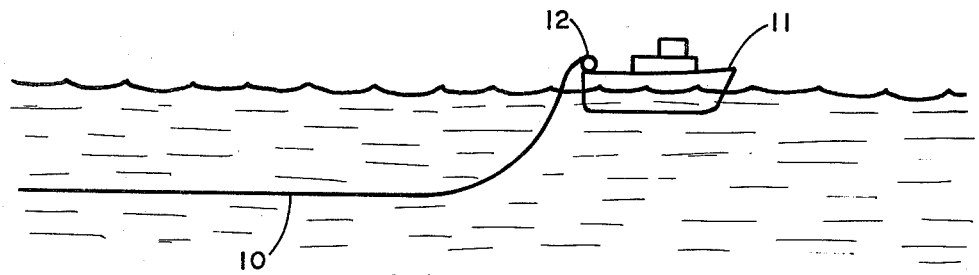
FIG. 1 is a schematic view of a hydrophone array of the type embodying this invention deployed in the water behind the towing ship.

Referring now to the drawings, FIG. 1 illustrates a hydrophone array 10 of the type to which this invention is directed, the array being towed in a generally horizontal submerged position, as shown, by a surface ship 11. The array may be stored on a reel 12 on the ship and is unwound therefrom for deployment in the water. When fully extended the array detects acoustic waves reflected from the floor of the sea for processing in a manner well known in the art of undersea seismic exploration.

Figure 2:
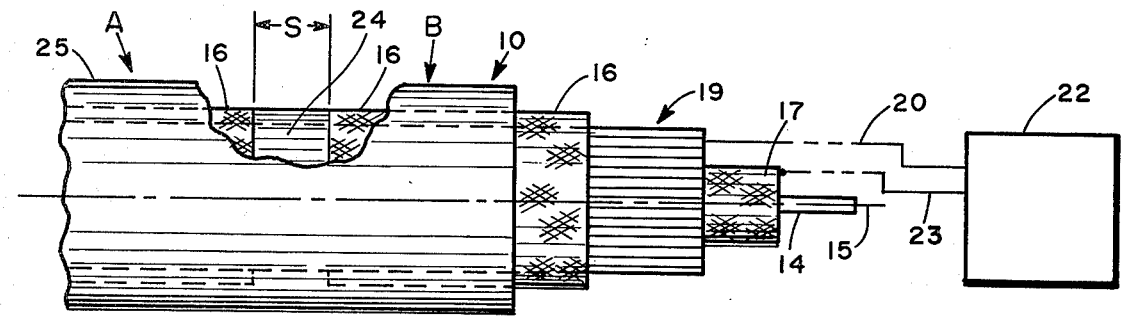
FIG. 2 is an elevation of part of the array assembly broken away to show details of construction.
Figure 3:
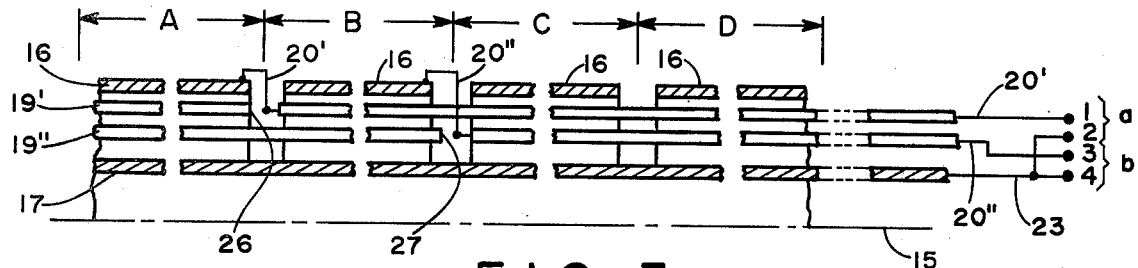
FIG. 3 is a schematic view showing electrical connections of two sections of the hydrophone array.
Figure 4:
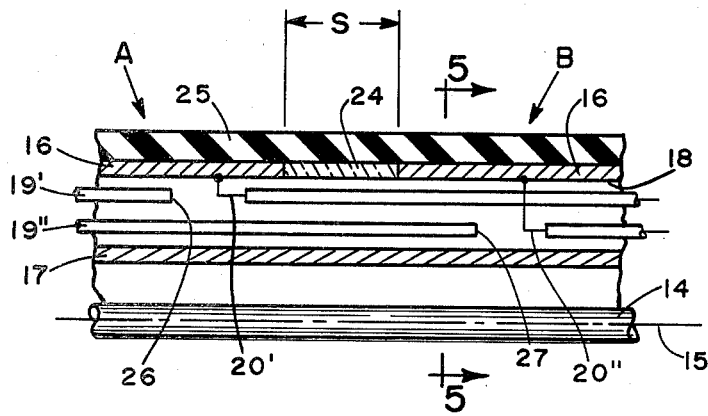
FIG. 4 is an enlarged longitudinal section of the upper part of the array with only two of electret cables being shown for clarity of construction details.
Figure 5:
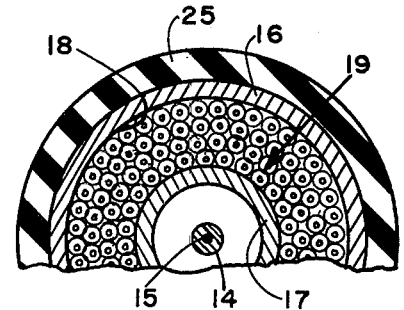
FIG. 5 is a transverse section taken on line 5—5 of FIG. 4.

Hydrophone 10 preferably is cylindrical and, in one embodiment of the invention, has a central stress member 14, see FIGS. 2, 4 and 5, such as a steel cable, which extends the full length of the array along its axis 15. Coaxially disposed about member 14 are a plurality of electrically separate hydrophone sections arranged in longitudinal series throughout the length of the array, four of such sections being represented schematically in FIG. 3 as Sections A, B, C and D. By way of example, a 2,000 meter array with 6-meter long sections has approximately 330 sections. Each section has a tubular, preferably cylindrical, outer conductor 16, and a similarly shaped inner conductor 17 of smaller diameter which extends throughout the length of the array and therefore is common to all sections. The annular space 18 between conductors 16 and 17 is filled by a plurality of electret cables 19 which are pressed together in a compact bundle between and tightly engaged by these conductors. Outer conductors 16 and inner conductor 17 may be formed of wire braid or the like to increase the flexibility of the array.

Figure 6:
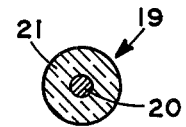
FIG. 6 is a transverse section of an electret cable forming part of the hydrophone array.

Each electret cable 19 comprises a conductive wire 20, see also FIG. 6, embedded in and covered by an electret 21 such as electrostatically charged tetrafluoroethylene (Teflon). Outer conductor 16 of each section is electrically connected by the wire 20 of one of the cables 19 to processing apparatus 22 on the ship 11 as described in greater detail below. Processing apparatus 22 is also electrically connected by lead 23 to inner conductor 17 and therefore is responsive to signals generated between the inner and outer conductors across electrets 21 due to the transducer action of the sections. The lengths of the sections preferably are equal and are determined by the signal resolution desired or required for the particular project or application. The physical spacing S between adjacent outer conductors 16, as shown in FIGS. 2 and 4, is relatively small, i.e., approximately 3 cm., compared to the length of a section, and preferably is filled by an insulator ring 24 which insures electrical isolation of adjacent outer conductors. An outer jacket 25 of flexible corrosion resistant material such as neoprene fits closely around the outer conductor and seals the assembly.

In operation, the slight mechanical deformation of one of outer conductors 16 relative to the charge distribution in the cable electret material 21 due to acoustical wave energy incident on the outer surface of the jacket 25 causes a voltage to be generated between the common inner conductor and the cable wire 20 connected to that outer conductor. A more detailed explanation of such transducer action is set forth in Patent No. 3,763,482. Since each transducer section is continuous throughout its length, the hydrophone has sensitivity throughout substantially its entire length. Furthermore, the generally cylindrical configuration of the hydrophone normally operationally deployed in the water with its axis horizontal insures optimal exposure and orientation of the array to acoustical waves reflected from the bottom of the sea.

In accordance with this invention, cables 19 perform a dual function of providing the electret material 21 in sufficient volume to fill the annular space 18 between conductors 16 and 17 and of providing the lead-out wires 20 for electrically connecting each separate outer conductor 16 to the processing apparatus at the end of the array. Accordingly, the number of electret cables is at least equal to the number of outer conductors 16 in the array and each cable may extend throughout the entire length of the array.

The array is constructed in accordance with one method by initially placing all electret cables 19 around inner conductor 17. The outer conductor of the last section in the array, i.e., the section at the trailing end farthest from the ship 11, is first applied tightly around all of the cables 19. Then one of the cables is cut at a point adjacent to that outer conductor, the wire 20 thereof is bared and is electrically connected to the outer conductor. Thus, if Section A in FIGS. 3 and 4 were considered to be the last or trailing end section in the array, cable 19' is severed as indicated at 26 and bared wire 20' in the forward part of the cable is connected to outer conductor 16 of Section A. Insulator ring 24 is then applied and the outer conductor 16 of Section B is next formed around cables 19. Another cable 19'' is then severed at a point adjacent to outer conductor 16 of Section B as indicated at 27 and its bared wire 20'' in the front end of this cable is electrically connected to the outer conductor of Section B. This process is repeated until all of the outer conductors of all of the sections are individually and separately connected by the wires, respectively, of the electret cables to the front end of the array.

The outer jacket 25 made of neoprene or the like is thereafter applied and the entire array is thus tightly enclosed and sealed. Jacket 25 has the desired flexibility and thickness to permit transmission of acoustic wave energy from the surrounding water to outer conductor 16 while at the same time providing a watertight cover for the assembly.

In the above example, wires 20' and 20'' of electret cables 19' and 19'', respectively, are connected to terminals 1 and 3 as shown at the front or ship end of the array. In order to complete the circuit for Sections A and B, the common inner conductor 17 is connected to terminals 2 and 4 by lead 23 as shown and the signal outputs across terminals 1-2 and 3-4 then constitute the product of transducer action by Sections A and B, respectively. In like manner, the other sections of the array are separately electrically connected to terminals at the front end of the array for appropriate connection to the processor.

Since inner conductor 17 is continuous throughout the length of the array, it may also function as the stress member, thereby eliminating cable 14 and further simplifying the assembly.

While this invention has been described as embodied in an array in which the inner conductor is a unitary member for simplicity of construction, it may be desirable to sectionalize this inner conductor to correspond to the outer conductors and to connect separate electret-covered lead wires to the inner and outer conductors, respectively, of each section so that the electret is between the outer and inner conductors. With such a construction a central stress member would be required to mechanically integrate the separate sections. Such a variation in array structure is also contemplated by this invention.

What is claimed is:

1. A hydrophone line array adapted to be towed by a ship and connectable to signal processing apparatus on said ship comprising
    inner conductor means extending along the array axis for the length of the array,
    a plurality of cables disposed around the exterior of said inner conductor means,
        each of said cables comprising a lead wire and an electret around said wire,
    a plurality of electrically separate outer conductors arranged in longitudinal series and tightly pressing said electret against said inner conductor means,
        the wires of said cables being electrically connected to said outer conductors, respectively, whereby acoustical energy incident upon any one of said outer conductors produces an electrical signal across said inner conductor means and the cable wire connected to said one outer conductor, and
    means for connecting said inner conductor means and said cable wires to said signal processing apparatus.

2. The array according to claim 1 in which said inner conductor means comprises an electrically continuous conductor.

3. The array according to claim 2 in which said conductors are cylindrical.

4. The array according to claim 1 in which said cables and said outer conductors and said inner conductor means are coextensive.

5. The array according to claim 1 with insulator means separating adjacent outer conductors.

6. The array according to claim 1 with jacket means tightly enclosing said outer conductors and sealing same.

7. A hydrophone line array comprising a plurality of sections arranged in longitudinal series, each section being separately responsive to acoustic wave energy incident on the array and comprising a tubular outer conductor, inner conductor means coaxially disposed within and radially spaced from said outer conductor and defining therewith an annular space, a plurality of electret cables filling said annular space and extending the length of the array, each cable having a wire and an electret around said wire, said outer conductors being electrically connected to one end of the array by said cable wires, respectively.

8. The array according to claim 7 in which the inner conductor means comprises a unitary continuous structure.

9. The hydrophone according to claim 8 in which each counter conductor is elongated and continuous, the physical spacing between adjacent outer conductors being small relative to the length of each outer conductor whereby the array is responsive to acoustic wave energy substantially throughout the entire length thereof.

10. The hydrophone according to claim 9 in which the lengths of said outer conductors are equal.

* * * * *